United States Patent [19]
Betz

[11] Patent Number: 5,398,664
[45] Date of Patent: Mar. 21, 1995

[54] IGNITION UNIT FOR INTERNAL COMBUSTION ENGINE

[75] Inventor: Dieter Betz, Vaihingen/Enz., Germany

[73] Assignee: Robert Bosch GmbH, Stuttgart, Germany

[21] Appl. No.: 111,703

[22] Filed: Aug. 25, 1993

[30] Foreign Application Priority Data

Oct. 8, 1992 [DE] Germany .......... 42 33 897.2

[51] Int. Cl.⁶ .................................. F02P 11/00
[52] U.S. Cl. .................... 123/635; 411/517; 411/918
[58] Field of Search ........... 123/635; 411/353, 436, 411/517, 918

[56] References Cited

U.S. PATENT DOCUMENTS

| | | | |
|---|---|---|---|
| 1,847,899 | 3/1932 | Robezzana | 123/635 |
| 3,887,990 | 6/1975 | Wilson | 411/918 |
| 5,038,745 | 8/1991 | Krappel | 123/635 |

FOREIGN PATENT DOCUMENTS

| | | | |
|---|---|---|---|
| 2306363 | 10/1976 | France | 411/517 |
| 2606498 | 9/1976 | Germany | 411/517 |

Primary Examiner—Noah P. Kamen
Attorney, Agent, or Firm—Frishauf, Holtz, Goodman & Woodward

[57] ABSTRACT

An arrangement for mounting an ignition coil on the cylinder head of internal combustion engines. Threaded bolts extend from the cylinder head. The thread having a substantially saw tooth cross section with the thread flank facing away from the cylinder head at an acute angle and the thread flank head oriented substantially normal to the axis of the bolt. The ignition coil, which for this purpose is provided with a bore, may be slipped onto the bolt and a fastener provided with a resiliently expansible locking member may thereafter be slipped onto the bolt.

9 Claims, 1 Drawing Sheet

IGNITION UNIT FOR INTERNAL COMBUSTION ENGINE

FIELD OF THE INVENTION

The invention, in general, relates to an arrangement for mounting ignition coils and, more particularly, to ignition coils of the kind complemented by a spark plug connector to form an ignition unit releasably mounted on the head of an internal combustion engine.

BACKGROUND OF THE INVENTION

It is known from U.S. Pat. No. 5,038,745, KRAPPEL et al., and corresponding German patent specification DE-A 3,727,458, to mount each ignition coil on the cylinder head using four bolts. For this purpose, four bores are provided in the core of each ignition coil in which, when the ignition coil is being mounted on the cylinder head, in matching bolts are received in the cylinder head. To complete the mounting, the ignition coil thus premounted is secured by fastening nuts threaded onto the bolts.

It is, however, disadvantageous that, when spark plugs are to be replaced which requires removal of the ignition coil from the cylinder head of the combustion engine, all nuts have to be removed from their bolts, which, particularly in combustion engines with a reasonable number of cylinders, is an involved operation.

SUMMARY OF THE INVENTION

The prior art apparatus is improved, in accordance with the invention, by providing an arrangement for quickly mounting, and disassembling, an ignition coil on the cylinder head of a combustion engine simply and quickly.

Briefly, the invention relates to an apparatus or appliance for mounting an ignition coil at the cylinder head of an internal combustion engine so that, for example, the ignition coil can be directly connected with the spark plug. The ignition coil is provided with a bore extending therethrough for mounting the ignition coil at the cylinder head. On the cylinder head there is anchored a bolt that can be received by the bore extending through the ignition coil. For securing the ignition coil at the bolt, a fastener is provided that is for example a sleeve provided with a collar and comprising a central recess. That sleeve can be inserted in the bore of the ignition coil and can be pushed onto the bolt, thereby receiving the bolt with its recess. For example, the sleeve is provided with a locking means that can be a spring washer protruding with one portion into said recess. The bolt is provided with a groove adapted to receive that portion of the spring washer thereby locking the sleeve at the bolt. The groove can be designed as a thread which allows release of the sleeve by turning it.

The groove comprises a first flank facing away from that cylinder head and a second flank facing toward the cylinder head. If the first flank is arranged in an acute angle to the axis of the bolt and the second flank is disposed normal to the axis, the sleeve can be pushed onto the bolt whereby the spring washer slips over the convolutions of the thread. On the other hand, the sleeve is locked onto the bolt and can only release by rotating it.

THE DRAWING

An advantageous embodiment of the invention is depicted in the single FIGURE and will be described in detail hereinafter. The single FIGURE shows a partial sectional view of a cylinder head with an ignition coil mounted thereon.

DETAILED DESCRIPTION OF THE INVENTION

Figure 1:
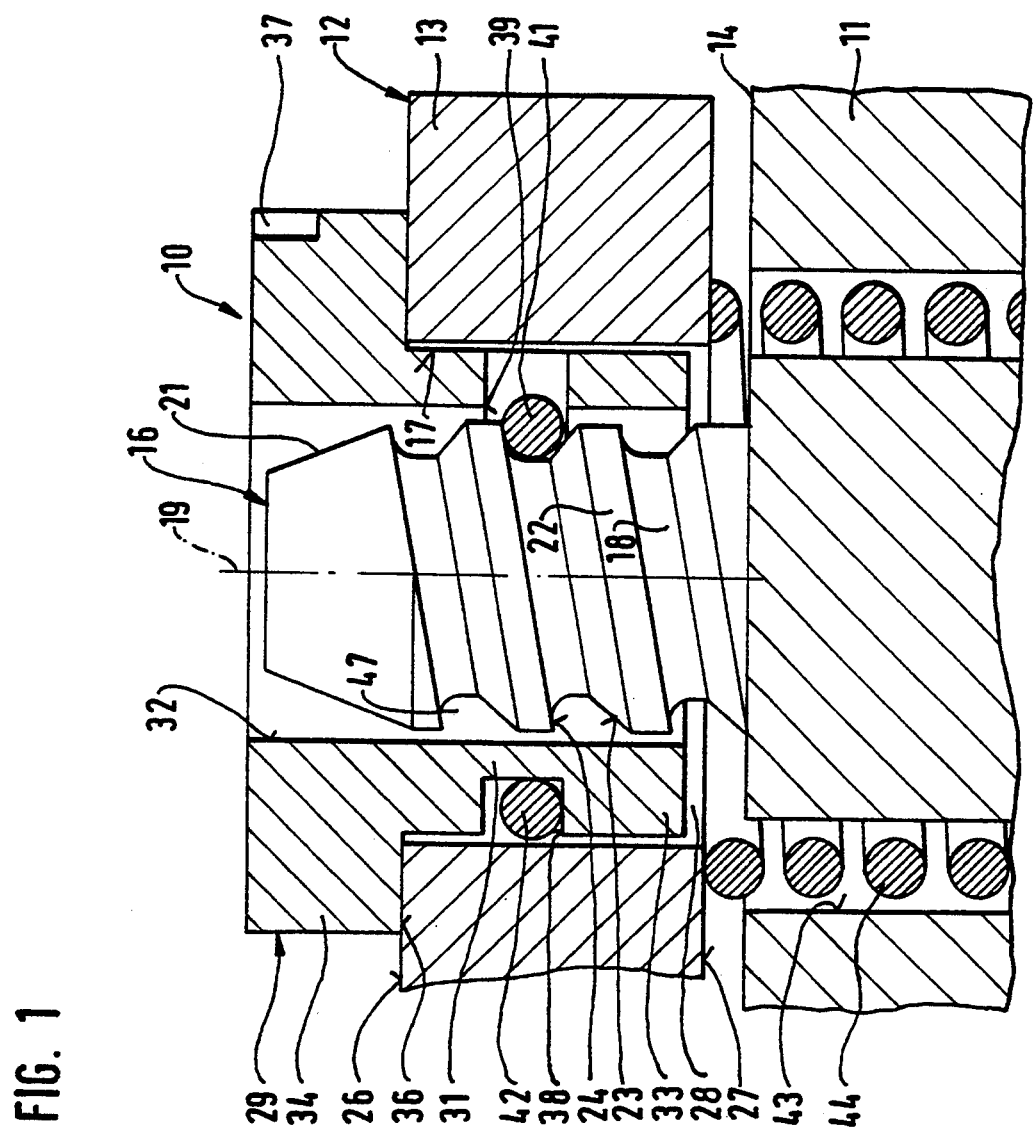

The single FIGURE shows is a mounting arrangement 10 on a multiple cylinder internal combustion engine, by means of which a separate ignition coil 12 integrated with a spark plug connector to form a complete ignition unit is mounted on each cylinder. The ignition coil 12 is mounted on the cylinder head 11 and is arranged so that the spark plug connector is inserted into the cylinder head 11 and is in direct contact with the spark plug secured therein.

The single drawing depicts in partial section the cylinder head 11 of the internal combustion engine with the ignition coil 12 mounted thereon. The ignition coil 12 comprises an iron core 13, and only a corner section of the externally positioned iron core 13 with a basic configuration of a frame has been shown. The plane of the iron core 13 being oriented normal to the spark plug well. The ignition coil 12 is provided with primary and secondary windings arranged on a center leg of the iron core 13 as known.

For each ignition coil 12, fasteners constituted by bolts 16 protrude from a closing surface 14 of the cylinder head 11 in parallel relationship to the axis of the spark plug well, the bolts 16 being spatially arranged to match the bores 17 provided in corner sections of the iron core 13 of the ignition coil 12. One corner section of the iron core 13, and a bolt 16, have been shown in the FIGURE by way of example and will be described.

The bolt 16 which is anchored in the cylinder head 11 is provided with a portion 18 of basically cylindrical configuration protruding beyond the closing surface 14 of the cylinder head 11, and having a longitudinal axis 19. At its free end, the portion 18 is provided with a conically formed taper 21 for easy connection. A thread 22 is provided, commencing at the taper 21 and extending almost to the closing surface 14 of the cylinder head 11. In cross section, the thread 22 is configured to be of a saw tooth profile with a large pitch, and, on the one hand, the flanks, relative to the longitudinal axis 19 of the section 18 corresponding to the axis of the spark plug well, form a flank 23 inclined at an acute angle relative to the closing surface 14 and, on the other hand, form a support shoulder 24 extending approximately normal radially of the longitudinal axis 19, whereby the first flank 23 may be of about the same inclination as the taper 21.

During its initial mounting, the ignition coil 12 is placed on the cylinder head 11 in such a manner that each bore 17, extending through the iron core 13 from a top surface 26 to a bottom surface 27 of the iron core 13, receives an associated protruding bolt 16.

The external diameter of the portion 18, relative to the internal diameter of the bore 17, is dimensioned so that during an initial mounting step, an intermediate space of hollow cylindrical configuration results between the two components, into which a fastening member 29 with limited radial play may be inserted.

The fastening member 29 is basically configured as a stepped hollow cylinder having a longitudinally extending bore 32 defined by a wall member 31 having a lead portion 33 of lesser diameter. An annular shoulder 36 is positioned in a radial plane and forms the transition to a manipulating member 34 of larger diameter and an engagement surface 37 provided in the manipulating member 34 suitable for rotating the fastening member 29.

Within the lead portion 33 there is provided an external annular groove 38 of rectangular cross-section which, over part of its circumferential extent, is provided with a slot 39, penetrating the wall member 31, through which is protruding a support section 41 of a support element seated in the annular groove 38 and constituted by a spring washer 42 and protruding into the bore 32 in an elastically expansible manner.

In the initially mounted condition, the bottom surface 27 of the iron core 13 faces the closing surface 14 of the cylinder head 11, and the shoulder 36 of the fastening member 29 abuts the top surface 26 of the iron core 13.

In the final mounting condition of the ignition unit 12 on the cylinder head 11, the fastening member 29, together with the iron core 13, is slipped onto portion 18 of the bolt 16, against the return force or bias of a spring element 44 constituted by a coil spring seated in a recess 43 of the cylinder head 11, by pressure longitudinally exerted on the manipulating member 34 and the longitudinal movement resulting therefrom. Thus, the support section 41 of the spring washer 42 slips over the tapered portion 21 and snaps into a thread groove 47 in order to slide over the flank 23 during continuing longitudinal movement in repeating steps and thereafter to snap into the part of the thread groove 47 displaced by one convolution, until such longitudinal movement comes to an end when the bottom surface 27 of the iron core 13 engages the terminal surface 14 of the cylinder head 11.

Once the pressure exerted on the manipulating member 34 ceases, the fastening member 29, in a countermovement induced by the counter force of the spring element 44, is locked by the support section 41 of the spring washer 42 engaging the support flank 24 of the thread 22. Since the support flank 24 extends at an approximately right angle relative to the longitudinal axis 19, sliding of the support section 41 in the opposite direction, into the adjacent convolution of the thread 47 is prevented, and the support section 41 as well as the ignition coil 12 connected thereto are arrested in a terminal position on the support shoulder 24, frictionally augmented by the return force of the spring element 44.

Release of the ignition coil 12 from its terminal position is possible only by rotational movement of the fastening member 29, with the support section 41 being guided within the thread groove 47 up to the tapered portion 21. For rotating the fastening member 29 the engagement surface 37 of the manipulating member 34 is provided as a flattened surface which may alternatively be shaped polygonally, knurled, slotted or as an Allen-type socket.

The arrangement described above permits the ignition coil 12 to be quickly mounted on the cylinder head 11.

In alternative arrangements, elements of the ignition coil 12 in reasonably close proximity with the cylinder head 11 may terminate the longitudinal movement in the final mounting step. The spring element 44 may alternatively be guided along a cylindrical portion of the bolt 16, and may be constituted by a helical pressure spring or by a leaf spring.

Furthermore, the thread 22 may be provided in the fastening member 29 instead of in the bolt 16, and the seat of the spring washer 42, instead of in the fastening member 29, may be provided in the bolt 16 so that the fastening member 29 may be snapped onto the bolt 16.

In an alternative embodiment, the fastening member 29 may be a radially expansible latch rather than as a sleeve, which latch, for removal from the bolt 16, may be pivotable relative thereto.

Furthermore, the thread 22 may be provided in peripheral portions of the bolt 16 only, interrupted by elongate cylindrical portions the outer diameter of which does not exceed the core diameter of the thread 22. Thus, the latch may be moved out of engagement with the thread 22 by partial rotation and may be slipped off the bolt 16 along a cylindrical portion thereof.

Also, the thread 22 may be an internal thread provided in the fastening member 29 constituted by a sleeve surrounding the bolt 16, and may be interrupted along peripheral portions by elongate segments in the fastening member 29 the internal diameter of which exceeds the core diameter of the thread 22. In this manner, the support portion 41 of the spring washer 42 engaging the bolt 16 may be released from the thread 22 by a partial rotation of the fastening member 29, and the fastening member 29 may be slid off the bolt 16 along a cylindrical segment.

In the manner of the arrangement describes above, an ignition coil 12 may quickly be mounted on, or detached from, a cylinder head 11.

What is claimed is:

1. Apparatus for mounting an ignition coil having a bore extending therethrough, on the cylinder head of an internal combustion engine, and said apparatus comprises:

an elongate bolt extending from a predetermined surface of the cylinder head along a predetermined axis;

a fastener for securing said ignition coil on said bolt, said fastener being adapted to be inserted into the bore of the ignition coil and having an axially extending recess therein adapted to receive said bolt;

a groove formed in one of said bolt and said recess; and locking means radially movable and resiliently biassed in radial direction engageable in said groove, thereby locking the fastener means against axial movement away from the cylinder head; and wherein said locking means are rotationally movable relative to the groove means to radially release the engagement and thereby unlocking the fastener.

2. The apparatus of claim 1, wherein said groove is divided by a flank of substantially saw toothed configuration having a first flank disposed at an acute angle relative to the axis and a second flank disposed substantially normal thereto.

3. The apparatus of claim 2, wherein said groove comprises a plurality of thread convolutions.

4. The apparatus of claim 3, wherein said thread convolutions are provided on a circumferential surface of said bolt and wherein said second flank faces said cylinder head.

5. The apparatus of claim 3, wherein said fastener is provided with means being engageable by means for imparting rotational movement to said fastener.

6. The apparatus of claim 1, wherein said radially resiliently expansible means comprises radially expansible ring means seated in one of said bolt and said recess in surrounding relationship to said axis.

7. The apparatus of claim 6, wherein said ring means protrudes into said groove along a predetermined peripheral extent of said bolt.

8. The apparatus of claim 1, wherein the free end of said bolt is tapered to facilitate reception by said recess.

9. The apparatus of claim 1, wherein said recess extends through said fastener.

* * * * *